United States Patent [19]

Tarnopolsky et al.

[11] 3,793,469
[45] Feb. 19, 1974

[54] GRAPHIC ANSWER INPUT DEVICE FOR A TEACHING MACHINE

[76] Inventors: Igor Rafailovich Tarnopolsky, ulitsa Zavodskaya, 33, kv. 27; Gennady Vasilievich Akimtsev, ulitsa Furmanova, 23, both of Frunze, U.S.S.R.

[22] Filed: Dec. 22, 1972

[21] Appl. No.: 319,921

Related U.S. Application Data

[63] Continuation of Ser. No. 182,653, Sept. 22, 1971, abandoned.

[30] Foreign Application Priority Data

Sept. 22, 1970   U.S.S.R............................. 1,472,777

[52] U.S. Cl. ............... 35/9 R, 200/5 A, 200/159 B, 178/18
[51] Int. Cl. ............................................ G09b 7/00
[58] Field of Search ...... 35/8 R, 8 A, 9 R, 9 A, 9 B, 35/9 C, 48 R; 200/5 R, 5 A, 159 B; 178/18

[56] References Cited
UNITED STATES PATENTS

| 3,106,027 | 10/1963 | Thelen ................................ 35/9 C |
| 3,522,664 | 8/1970 | Lambright et al. ................... 35/8 R |

*Primary Examiner*—Wm. H. Grieb
*Attorney, Agent, or Firm*—Holman & Stern

[57] ABSTRACT

A graphic answer input device for a teaching machine comprising successively superimposed parts: a contact-bearing board every contact of which is connected to the logical unit of the teaching machine via two diodes individually connected in the forward direction; a punched card; a current-carrying plate and a problem blank on which the student drafts the required drawing.

In the design the diodes belonging to the contacts forming one row are interconnected and form one line, while other diodes belonging to the same contacts of the same row are also interconnected and form another line.

1 Claim, 1 Drawing Figure

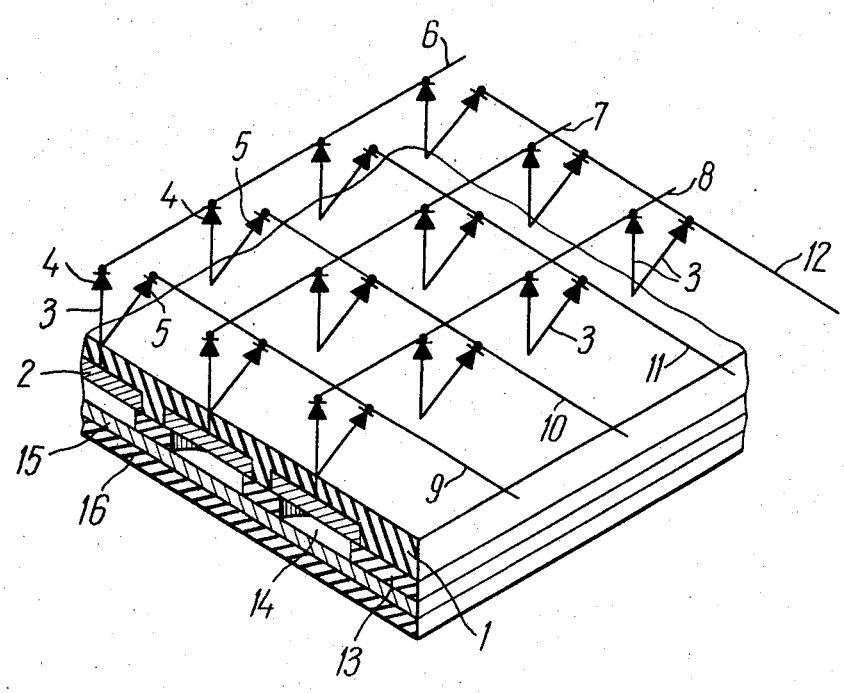

GRAPHIC ANSWER INPUT DEVICE FOR A TEACHING MACHINE

This application is a continuation of Ser. No. 182,653, filed Sept. 22, 1971, and now abandoned.

BACKGROUND OF THE INVENTION

The invention relates to computer technology and automatics and in particular to graphic answer input devices for teaching machines. The present invention is intended for machines used for teaching students and for controlling their knowledge in descriptive geometry and technical draftsmanship. It can however also be used for other technical and mathematical applications where graphical solutions are possible.

Known in the art is a graphic answer input device for teaching machines, comprising a contact-bearing board made of an insulation material with metal contacts fixed into it under pressure in a regular geometrical order. Attached to the contacts are wire leads with plugs at their ends which are used to manually the contacts with the logical unit of the teaching machine. Successively superimposed on the contactbearing board are: a punched card made of a sheet of ordinary paper with holes; a metal elastic plate connected to one of the terminals of a low voltage D.C. supply, and a problem blank on which the student has to make a drawing as required by the conditions of the training problem. The input of the answer with the use of this device is accomplished in the normal manner, i.e., by means of drawing lines directly without resorting to auxiliary actions or operations, and consists in that when the student draws a line with a pencil on the problem blank the latter will yield to the pressure and sag together with the current-carrying elastic plate in the places where there are holes in the punched card. The current-carrying plate touches the respective contacts of the contact-bearing board and, in doing so, transfers to the contacts an electral pulse which is transmitted, via connection wires, to the logical unit of the teaching machine. It should be noted that it is not all the contacts of the contact-bearing board that are commutated but only those pairs which determine the programmed lines of the required drawing, while the sequence of operation of contact pairs is preset in the logical unit of the teaching machine.

A drawback of the known device consists in that the electrical connections (commutation) between the contacts of the contact-bearing board and the logical unit of the teaching machine are established manually, and this is a rather labour consuming job which apart from the considerable time involved, also requires that the operator receive a certain amount of prior knowledge and training from the operator.

SUMMARY OF THE INVENTION

The object of the invention is to design a graphic answer input device for a teaching machine which allows the machine to be reprogrammed automatically The object is achieved by providing a graphic answer input device for a teaching machine which comprises the following parts successively superimposed one upon another a contact bearing board whose contacts are arranged in rows and electrically coupled with the logical unit of the machine; a punched card; a current-carrying plate and a problem blank on which the student is to make the required drawing, the holes in the punched card being made so as to make it possible for the current-carrying plate to touch respective contacts of the contactbearing board in case the student has drawn the successive line of the drawing correctly, and in which, according to the invention, every contact of the contact-bearing board is connected to the logical unit of the teaching machine via two diodes connected individually in the forward direction, while certain of the diodes belonging to the contacts that form one row, are interconnected and form one line other diodes belonging to the same contacts of the same row are also interconnected and form the second line.

BRIEF DESCRIPTION OF THE DRAWINGS

The invention will be better understood from the description of an embodiment given by way of example with reference to the accompanying drawing which presents an isometric view of the graphic answer input device for a teaching machine according to the invention (upside down cross section).

The graphic answer input device for a teaching machine which is the subject of the present application comprises: a contact-bearing board 1 made as a plate of an insulating material with metal contacts 2 isolated from one another and fixed into the plate under pressure and arranged in regular geometrical rows. Connected to every contact 2, via wire leads 3, are two forward biased diodes 4 and 5. The diodes connected to the contacts, form two types of lines. One group of the diodes form lines 6, 7, 8, etc., while the other group 5 of the diodes form lines 9, 10, 11, 12, etc. All the lines 6, 7, 8, and 9, 10, 11, 12 are electrically connected to respective rows of the decoder in the logical unit of the machine (not shown in the drawing).

Superimposed on the contact-bearing board 1 in succession are: a punched card 13 with holes 14, then a current-carrying elastic metal plate 15 connected to one of the poles of a low voltage D.C. supply (not shown in the drawing) and a problem blank 16.

The instant device makes it possible to feed the machine with an unlimited number of programs and various versions of their realization while the answer is formulated by the student himself due to the fact that one and the same contacts 2 of the contact-bearing plate 1 can operate a substantial numbero of times. Additionally, manual recommutation is eliminated completely and it becomes possible to fully automate the process of reprogramming the teaching machine.

The device operates in the following way.

When the student draws, with a pencil, the successive line of the drawing on the problem blank 16 the latter will yield to the pressure of the pencil and sag together with the current-carrying elastic metal plate 15 exactly in the places where there are holes 14 in the punch card 13. Thus, the plate 15 will touch the contacts 2 of the board 1, and an electrical contact will be established so that all the contacts 2 which are located along the line being drawn by the student receive an electrical pulse. Although the plate 15 touches many contacts 2 of the board 1, the logical unit of the machine will be fed with only two pulses everyone of which will present a sum of two individual signals arriving at the decoder of the logical unit from one and the same contact 2 of the board 1 along the circuits 3-4-6 of one of the rows and the circuits 3-5-9 of the other rows. This selectability in presenting electrical pulses generated due to the fact that the plate 15 touches the contacts 2 of the board 1 and the directivity of their transmission through the individually connected diodes 4 and 5 via wire leads 3 to the logical unit of the machine makes it possible, at every programed stage of drafting a drawing, to operate only two quite definite contacts 2 of the board 1. These are the contacts that unambiguously determine the successive line of the required drawing. The sequence of the pair-by-pair operation of the contacts 2 of the board 1 in accordance with the program is preset in the logical unit of the machine.

The design of the instant device differs from known versions in that it is more reliable in operation, makes it possible for the student himself to automatically reprogram the teaching machine without requiring any complex operation to recommutate the graphic answer input device with the logical units of the teaching machine while the answer input procedure in this case remains natural, i.e., it consists in drafting successive lines of the required drawing with the use of standard drafting tools.

We claim:

1. A graphic answer input device for a teaching machine having a logic unit and comprising:

a contact bearing board having a plurality of contacts arranged in rows thereon and electrically connected to said logic unit;

means disposed on said contact board for transmitting electric pulses to definite contacts of said plurality of contacts corresponding to a correct successive stage being drawn by a pupil on a problem blank of said graphic input device, each of said plurality of contacts being connected to said logic unit via two diodes connected separately in a conductive direction, one of said two diodes belonging to each contact forming a row being connected to one another to form one line, while the other of said two diodes belonging to the same contacts of the same row being connected to one another to form another line.

* * * * *